Nov. 21, 1967 S. E. WAHLSTROM 3,354,318

LOOP SENSING SYSTEM FOR MAGNETIC TAPE TRANSPORTS WHEREIN LOOP INTERCEPTS LIGHT BEAM

Filed April 20, 1964

INVENTOR
SVEN E. WAHLSTROM
BY Robert G. Clay
ATTORNEY

United States Patent Office 3,354,318

Patented Nov. 21, 1967

3,354,318

LOOP SENSING SYSTEM FOR MAGNETIC TAPE TRANSPORTS WHEREIN LOOP INTERCEPTS LIGHT BEAM

Sven E. Wahlstrom, Los Angeles, Calif., assignor to Ampex Corporation, Redwood City, Calif., a corporation of California

Filed Apr. 20, 1964, Ser. No. 360,911

6 Claims. (Cl. 250—219)

This invention relates to web transport systems, and particularly to vacuum chamber compliance mechanisms for digital magnetic tape transports.

The digital magnetic tape transport provides a particularly striking example of the performance capabilities of modern web transport mechanisms. In order to store data at high density and to permit its recording and reproduction at high data transfer rates, a magnetic tape must be driven very precisely at high rates of speed. Additionally, however, lost time must be kept to a minimum, so that the tape must be started and stopped in very short distances and in only a relatively few milliseconds of time. High acceleration and deceleration rates are achieved by using special mechanisms capable of making the necessary speed changes with minimum stress on the tape. The tape is, however, stored on relatively massive reels which have far greater inertia than the tape acted on by the tape advance and stopping mechanism. Even excessively large motors cannot provide acceleration rates comparable to that at the starting and stopping mechanism. Accordingly, the digital tape transport generally employs some form of compliance mechanism, either multiple loop tension arms or vacuum chambers, which mechanically isolate the tape reels from the higher speed portions of the system.

The majority of digital tape transports in use today employ capstan and pinch roller mechanisms, or variations of these mechanisms using pneumatic or vacuum techniques. In such mechanisms, either of a pair of contrarotating capstans is engaged to the tape, depending upon the direction of movement desired. In a simpler but yet more advanced type of transport which has recently been introduced, a single capstan in continuous engagement with the tape is caused to accelerate, decelerate or run in either direction, thus driving the tape in different modes of operation through variation of electrical signals alone. This system also uses a low inertia compliance mechanism, usually a vacuum chamber.

The servo systems for tape transports such as those mentioned sense the status of the tape in the vacuum chamber and provide one or more signal indications to a servo system which controls the motor for the adjacent tape reels. Thus, if tape is suddenly fed into a chamber and the tape loop is lengthened, the servo accelerates the motor to withdraw tape, although at a lower rate. The means for indicating the status of the tape, i.e., the loop length, may comprise pressure sensing devices or photosensitive devices, positioned at one or more points along the length of the vacuum chamber. With the pressure sensitive device, for example, the switch may close whenever the pressure in the adjacent region of the chamber changes from substantially vacuum to substantially atmospheric, in accordance with the change in the loop position in the chamber. Electromechanical devices of this nature are, however, subject to wear and inevitable inaccuracies unless they are precision made and expensive, and even so are limited in their response time and to a degree as to reliability.

Photosensitive devices, on the other hand, are subject to other problems. Ordinarily, a source of illumination is mounted in one chamber sidewall, and a detector is mounted in the other chamber sidewall at a directly opposing point. The light path between the source and the detector is intercepted by the tape loop when it reaches a corresponding length within the chamber. It is found, however, that the apparent simplicity of this arrangement does not provide adequate reliability unless a number of specific precautions and features are employed. In order to obtain adequate signal-to-noise ratio, the detector must be at least partially shielded from ambient light, and in addition the light falling on the detector must have appreciable intensity. These modifications can be achieved by utilizing appropriate structures on each side of the chamber, such as a filament and lens system at the light source, and an appropriately shielded detector at the other side. Even with such arrangements, steps must usually be taken to insure that the filament is correctly positioned with respect to the lens, so as to ensure that the light beam falls directly on the detector. Such mechanisms are not only more expensive than desired, but additionally require the provision of expensive means for adjustment, as well as the adjustments themselves.

It is therefore an object of the invention to provide improved loop sensing arrangements for web transport mechanisms.

Yet another object of the invention is to provide an improved photosensing arrangement for the vacuum chamber compliance mechanisms in digital magnetic tape transports.

Yet a further object of the present invention is to provide an improved means for indicating the passage of the variable loop length member in a web transport system.

These and other objects of the present invention are achieved by an optical sensing system which employs a unitary assembly mounted in one corner of a variable loop chamber. The photosense mechanism is mounted so as to provide a light path which is intercepted by a longitudinal edge of the extending loop. The source and the detector are positioned closely adjacent to each other, but the light is not focused or shielded. A relatively weak lamp may be used without a lens system or without need for adjustment, and the entire structure may be made unitary and compact.

A specific example of an arrangement in accordance with the invention is provided by a photosense mechanism used in the vacuum chamber of a digital magnetic tape transport. A photosensitive device is mounted in a sidewall of the chamber, close to an adjacent point on the rear wall, at which is positioned a relatively weak light source which provides unfocused illumination of the photosensitive device. The light path is thus directed across a rear corner of the vacuum chamber, at a selected lengthwise position relative to the loop. The tape loop intercepts the light path only by interposing a side edge of the tape at a point above the bottom of the loop, and close to the side of the chamber. Because the tape loop is reproducible, this sensing of a side position provides an accurate indication of loop length. Furthermore, the external light on the photosensitive device is reduced, although a high signal level is derived from the light source. The mechanism may be assembled as a single integrated unit that may be prechecked prior to installation and that does not require subsequent adjustment.

Better understanding of the invention may be had by reference to the following description, taken in conjunction with the accompanying drawing, in which.

Figures 1, 2, 3:
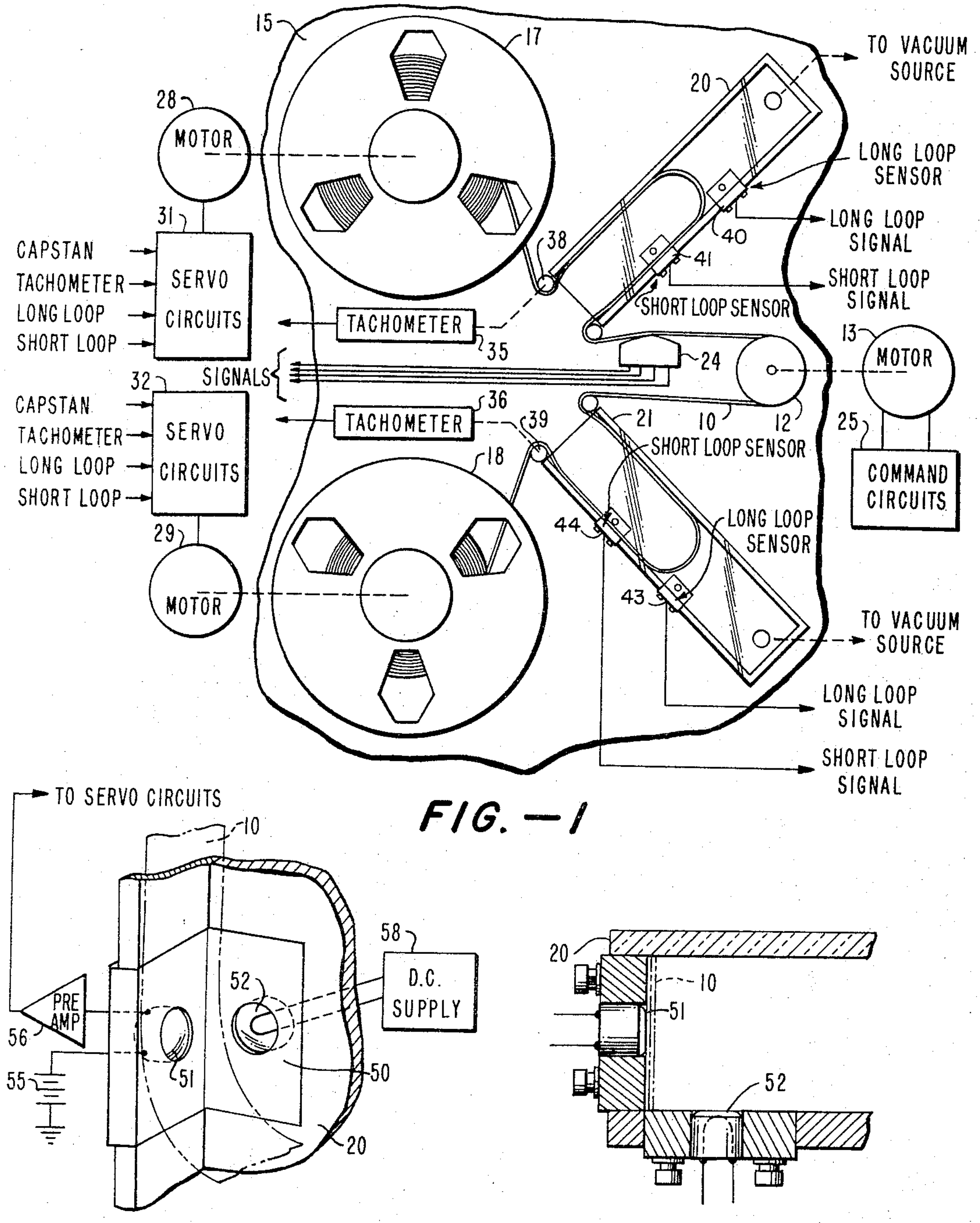
FIG. 1 is a simplified front view of the front panel of the digital tape transport system employing a loop position sensing system in accordance with the invention.
FIG. 2 is an enlarged perspective view, partially broken away, of an optical sensing system in accordance with the invention.
FIG. 3 is a plan sectional view of the optical sensing system of FIG. 2.

The optical sensing system and devices described herein may be utilized in sensing the loop position of any of a wide variety of web, tape, band, or like members. However, the particular requirements of magnetic tape transport systems are such that the invention is apt to find greatest use in this conjunction. Accordingly, the device in accordance with the invention will be described in connection with a digital magnetic tape transport of the type using a single capstan drive. It will also be recognized by those familiar with the art that any radiant energy sysem may be employed and that the source and detector need not operate in the wavelength of visible light.

An exemplary system is shown in FIG. 1, in which a tape 10 is driven bi-directionally by a single capstan 12 operated from a high torque-to-inertia ratio motor 13. Only the front panel 15 of the mechanism has been shown, for simplicity. The tape 10 is confined to a low friction guide path between a supply reel 17 and a takeup reel 18, and held in a balanced, relatively low tension arrangement, about the capstan 12 by a pair of substantially symmetrically disposed vacuum chambers 20, 21. The vacuum chambers conventionally have transparent front walls, in order that tape operation may be observed, and therefore expose internal elements to ambient light. Data to be recorded or reproduced is coupled to associated systems and circuits (not shown) to or from magnetic heads 24 disposed along the tape path between the capstan 12 and one of the vacuum chambers 21.

Command circuits 25 are coupled to control the operation of the motor 13 for the single capstan 12, and to drive the capstan 12, and therefore the tape 10 through selected sequences of acceleration, deceleration, and continuous operation in either direction. Because of a relatively high wraparound angle of the tape 10 about the capstan 12, and because of the low friction tape path, there is no relative slippage between the tape 10 and capstan 12. Each reel 17 and 18 is driven by a separate servo motor 28 or 29 respectively, energized under control of associated servo circuits 31 or 32 respectively. The servo circuits, not shown in detail, include conventional summing networks, servo amplifiers, and motor drive amplifiers.

In a preferred form of reel servo system, a tachometer is driven by a roller guide 38 or 39 mounted at the exit end of each vacuum chamber 20, 21. Each tachometer senses the tape velocity between the vacuum chamber 20 or 21 and its associated reel 17 or 18. This signal is summed together with other input signal components in the servo circuits, and is used in such a fashion as to maintain positive control of the tape loop length in the vacuum chamber. Preferably, loop lengths are maintained at optimum positions which are dependent upon the direction of tape movement. Thus, if tape is being fed into a vacuum chamber 20 from the capstan 12, the most rigorous change of mode which can be imposed is to operate the capstan 12 so as to impart a sudden change of direction to the tape 10, because this immediately tends to draw tape 10 out of the chamber 20. The optimum loop length for this condition, therefore, is a relatively long loop within the chamber 20. In the converse situation, in which the capstan 12 is drawing tape out of the chamber 20, the optimum length is a short length within the chamber 20, so that immediate reversal of the tape direction permits the tape loop to lengthen for a relatively longer distance until the slower acting reel motor can be brought to equal speed.

Preferably, the servo system also utilizes input signals from loop length sensors 40, 41 respectively, and 43, 44 respectively at two or more different points along each vacuum chamber 20 and 21. The loop length sensors 40, 41 and 43, 44 provide input signals which, when summed together with the other input signals, are used to maintain the desired loop length for the given mode of operation. The remaining input signal to the servo circuits is a capstan velocity signal which establishes the mode of operation. As will be understood by those skilled in the art, the optimum loop length for each condition of operation will be determined not only by the servo response, but also by the dynamics of the tape transport mechanism. Thus there must be adequate lengths both at the input and in the outlet end of the vacuum chamber to allow for a degree of movement of the tape beyond the sensing positions.

While this positive control of loop tape placement is preferred, many reel servo systems are employed in which the loop length sensors merely provide limit switch functions in that they indicate that the loop length has gone out of a control range and is to be immediately returned to a point between the limit positions. Within the control range, other means such as capacitive sensing means or other analog signal generators may be employed to indicate loop length, and to generate signals which can be utilized for controlling the reel servo motor on a proportional basis.

It is therefore apparent that the proper operation of the loop length sensors can be of critical importance to all such systems. Air turbulence and pressure fluctuations such as are encountered with pressure sensitive switches, and the relatively slow operation of such switches, are factors which create difficulties in attaining the desired level of long term reliability. As previously discussed, conventional photosensing or optical systems detect loop length by directing a focused light beam across the chamber to sense the bottom of the tape loop.

In accordance with the present invention, as shown in FIGS. 2 and 3, a superior optical sensing system is provided by a loop length sensor which senses an off-center edge of the tape loop. A unitary assembly 50 which is illustrative of any or all the sensors 40, 41, 43 and 44 is provided. The assembly 50 includes a photosensitive detector 51 mounted in a portion forming part of the side wall of the vacuum chamber, e.g., 20, and facing directly toward the broad face of a tape loop in the vacuum chamber, adjacent a back corner of the chamber 20. On the other side of the angle, defined by the two walls at the corner a light source 52 is mounted as a direct illuminating element, but without a focusing lens. The light source 52 is set directly in the back wall, and faces normal to the transverse dimension of the tape. The photosensitive element 51, here a cadmium selenide detector, is coupled in circuit with a DC source 55 and a preamplifier 56 which is coupled to the servo circuits (FIG. 1). The light source 52 is a Chicago Miniature lamp (M8–640), energized from a DC supply 58 of 10 volts. Operated in this manner, at low voltage well below its 74-volt rating, the lamp has a life expectancy in excess of the majority of the system.

This mechanism, therefore, senses loop length by sensing a condition in which a longitudinal edge of the tape 10 intersects the oblique light path between the source 52 and the detector 51. The arrangement relies partially on the reproducibility of the shape of the tape loop, which in turn is assured by the constant cross-section chamber 20, the substantially constant pressure differtial across the tape, and the pliant nature of the tape 10 itself. Although the arcuate portion of the tape loop is not precisely circular, because of air boundary layers and other effects, the loop shape is substantially constant under all conditions of operation. Therefore, the loop position is accurately identified by sensing an edge point along the arcuate portion.

In a practical example of a system in accordance with the invention, the spacing between the side walls is approximately 2.5 inches, so that the approximate radius of the arcuate bottom part of the tape loop is approximately 1.25 inches. The detector 51 center is .25 inch from the corner, and the light source 52 center is .1875 inch from the corner, so that the light path is at an approximate 50° angle relative to a line normal to the broad face of the tape 10.

This arrangement has a number of advantageous features.

The closer the light source 52 and detector 51 are together, the greater the signal-to-noise ratio and also the more definite the indication of the presence or absence of the loop. The light source 52 may be placed so close to the detector 51 that no lens system or adjustment need be used, even with a relatively weak bulb. Additionally, however, the ambient light from the front transparent wall is of materially less effect than in conventional systems in which the beam is intersected by the bottom of the loop. In such arrangements, the focused light beam is interrupted slightly more abruptly, because the bottom of the loop advances in a direction normal to the beam. The ambient light, however, diminishes relatively slowly as the loop continues to extend until the detector is finally covered. In contrast, present mechanisms provide a much sharper diminution in ambient light once the tape loop edge intersects the light path. Consequently, the switching point is much more clearly defined, even through no particular demands are placed on the optical system.

In addition, the direct insertion of light source and detector at closely adjacent points permits the entire unit to be made as a compact subassembly which can be assembled and attached as a whole. The light source and detector can be faced toward each other, but this is not necessary. In the specific example above, the detector surface was centered about an axis normal to the broad face of the tape, and the lamp was centered about an axis parallel to the broad face of the tape.

The closer the light source 52 and detector 51 are together, the greater the distance between the sensing mechanism and the bottom of the loop, and the closer the sensing mechanism is to the straight sides of the loop. Thus, at the point in the loop in which the arcuate portion straightens into the side portion, the greater the deviation in signal indication which results from changes in the shape of the loop of a minor nature. Accordingly, it is preferred to keep the angle of the light path relative to the broad face of the tape sufficiently high to ensure that a point on the curved part of the loop is sensed.

While there have been described above and illustrated in the drawings an optical sensing system for detecting loop lengths and a web transport mechanism, it will be appreciated that the invention is not limited thereto, but may have a number of modifications or alternative forms, so that the scope of the invention is to be defined solely by the appended claims.

What is claimed is:

1. An optical sensing system for a vacuum chamber in a digital magnetic tape transport, said chamber including side and back walls joining to form a corner which extends along the line substantially parallel to the midline of the tape loop, said system including means providing a radiant energy path across said corner and radiant energy detector means disposed in said side wall.

2. An optical sensing system for a vacuum chamber in a digital magnetic tape transport comprising:

a photosensitive element positioned in a side wall of the vacuum chamber, and an unfocused light source positioned in the back wall of the vacuum chamber, the line between the photosensitive element and the light source intercepting a longitudinal edge of the loop at a point which is off-center relative to the loop midline.

3. In a vacuum chamber system for magnetic tape transports, an optical sensing system comprising:

means providing a photosensitive device having a sensitive surface positioned in a side wall and adjacent a back corner of the chamber, a non-focused light source disposed in the back wall of the chamber adjacent the said back corner of the chamber, the light path between the light source and the photosensitive device extending across the edge of a tape loop in the chamber at an oblique angle to the broad surface of the tape, and the light source being positioned between the midline of the chamber and the side wall in which the photosensitive device is positioned.

4. A loop position sensing mechanism for a web transport system which forms a variable length loop in the web, including the combination of means comprising a chamber for forming a variable length loop in the web, the chamber having at least one face which is open to ambient light, radiant energy means and photosensitive means positioned in adjacent walls of the chamber, in a corner of the chamber such that an extending loop intersects a line between the radiant energy means and the photosensitive means, the radiant energy means being unfocused and positioned between the midline of the chamber and the wall in which the photosensitive means is positioned.

5. A loop position sensing mechanism for detecting a particular position of a variable length web which extends and contracts along a given channel, including the combination of means positioned along one side of the channel and in facing relation to a broad face of the web, for sensing radiant energy, and a radiant energy source positioned along an adjacent side of the channel and in a plane normal to the broad face of the web, the line between the means for sensing and the radiant energy source extending at an angle other than normal to the broad face of the web, and intercepting a longitudinal edge of the web at an off-center region when the web extends to a length beyond the line between the means for sensing and the radiant energy means.

6. The invention is set forth in claim 5 above, wherein the channel is defined by a straight-sided vacuum chamber having a substantially transparent front face, wherein the means for sensing radiant energy comprises a cadmium selenide detector, wherein the light source comprises a filament lamp and means exciting the filament at substantially below its rated voltage, and wherein the line between the detector and the lamp is at a 25–65° angle relative to a line normal to the broad face of the web.

References Cited

UNITED STATES PATENTS 3,197,645 6/1965 Sperry ............ 215—219

ARCHIE R. BORCHELT, *Primary Examiner.*

RALPH G. NILSON, *Examiner.*

M. ABRAMSON, *Assistant Examiner.*